UNITED STATES PATENT OFFICE.

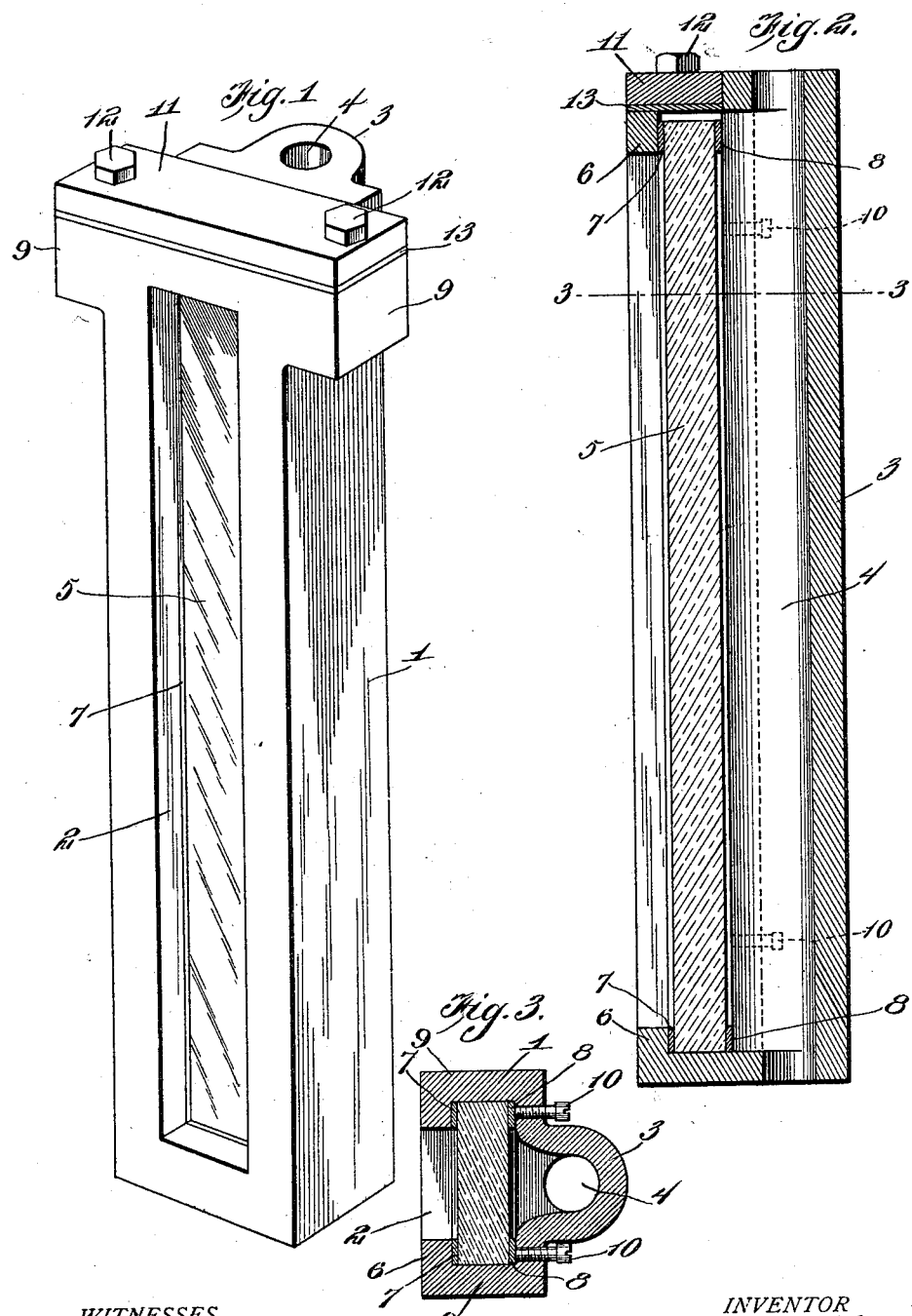

COLEMAN CONNOLLEY, OF BOSTON, MASSACHUSETTS.

WATER-GAGE.

993,225.

Specification of Letters Patent. Patented May 23, 1911.

Application filed November 4, 1910. Serial No. 590,677.

*To all whom it may concern:*

Be it known that I, COLEMAN CONNOLLEY, a citizen of the United States, residing at Boston, in the county of Suffolk and State of Massachusetts, have invented certain new and useful Improvements in Water-Gages, of which the following is a specification.

This invention relates to water gages for steam boilers and for other purposes, and one of the principal objects of the same is to provide simple, reliable and efficient means for indicating the water line in steam boilers, said water gage comprising a metal frame provided with means for securing the glass therein, and providing a water tight joint between said frame and glass.

Another object of the invention is to simplify and render more efficient the frame for holding the glass, through which the water line is seen in the gage.

Still another object of the invention is to provide a water gage frame of simple construction made from a single piece of metal and provided with means for reliably holding the glass in place therein, said frame being provided with a detachable cover or bonnet, means being provided for forming water tight joints between the frame and glass.

These and other objects may be attained by means of the construction illustrated in the accompanying drawing, in which, Figure 1 is a perspective view of a water gage made in accordance with my invention. Fig. 2 is a central vertical section taken through the gage. Fig. 3 is a transverse sectional view on the line 3—3 of Fig. 2.

Referring to the drawing the numeral 1 designates the frame of the water gage, said frame having a rectangular elongated opening 2 in its front side. The frame 1 is practically rectangular in cross section and is provided with a rounded rear side 3 forming a gage chamber 4, in which the water is admitted from the boiler. The walls of the chamber 4 may be plated with silver in order to indicate a sharp water line through the glass. A glass plate 5 is fitted in the frame against the flanges 6 which surround the opening 5. A rubber gasket 7 is disposed between the front edges of the glass 5 and the flanges 6, while a steel gasket 8 surrounds the rear edges of the glass plate 5. At the upper end of the frame, side projecting ears 9 are provided. Set screws 10 extend through the rear of the frame and bear against the steel washer or gasket for forcing the glass against the rubber gasket 7 and thus forming a water tight joint. Set screws are also provided at the lower end of the frame for forcing the glass against the rubber gasket. To permit the glass plate 5 to be readily removed from or connected to the frame, a bonnet or cover 11 is provided, said bonnet being secured in place by means of lag screws 12 which extend through a rubber gasket 13 and into the ears 9 of the frame.

From the foregoing it will be obvious that my water gage is of simple construction, being made of two parts and of practically uniform thickness of metal throughout, said frame serving to hold the glass plate in place and to form a reliable water tight joint between the frame and glass and to permit the ready removal of glass whenever required.

I claim:

A water gage comprising a frame having an opening in the front side thereof and a water chamber extending from end to end in rear of said opening, said frame having inwardly extending flanges, a removable glass plate secured to the frame, a rubber gasket surrounding the glass at its front side and bearing against the flanges on the frame, a metal gasket surrounding the glass at the rear thereof, and binding screws extending through the frame and bearing against the metal gasket for holding the glass firmly against the rubber gasket and forming a water-tight joint therefor.

In testimony whereof I affix my signature in presence of two witnesses.

COLEMAN CONNOLLEY.

Witnesses:
 CHARLES HENERY HALL,
 TIMOTHY F. CALLAHAN.

Copies of this patent may be obtained for five cents each, by addressing the "Commissioner of Patents, Washington, D. C."